Patented Jan. 10, 1950

2,494,060

UNITED STATES PATENT OFFICE 2,494,060

PROCESS OF SELECTIVELY REMOVING FORMALDEHYDE FROM A FORMALDEHYDE-GLYOXAL MIXTURE

Harold E. Schofield, Binghamton, N. Y., assignor to General Aniline & Film Corporation, New York, N. Y., a corporation of Delaware No Drawing. Application November 9, 1948, Serial No. 59,194

3 Claims (Cl. 260—601)

This invention relates to an improved method for selectively removing formaldehyde from a formaldehyde-glyoxal mixture.

In the preparation of photographic gelatin dispersions or gelatino silver-halide emulsions, it is the practice to treat the dispersions or emulsions prior to coating with a hardening agent so as to reduce the tendency of the gelatin to soften or to distend during processing of the photographic material containing the gelatin, particularly at temperatures higher than those specified for processing the particular photographic material. Compounds which have been used for hardening gelatin as such or in silver halide emulsions are formaldehyde, hydroxy aldehydes, acrolein, and derivatives thereof. Of these, formaldehyde has been extensively employed in view of its cheapness and commercial availability. Although formaldehyde is satisfactory as a hardening agent, it possesses the undesirable property of producing fog, desensitization or flattening of gradation in the processed film.

Within recent years, glyoxal has attained prominence as a hardening agent for photographic gelatin and gelatino silver-halide emulsions. The principal reason for its acceptance and use is the fact that it does not possess any of the undesirable properties of formaldehyde. Its use, however, entails certain difficulties.

Monomeric glyoxal, which is the simplest of the dialdehyde series, is a yellow product melting at 15° C. It is completely hydrated in aqueous solution and when such solution is heated on a water bath, the glyoxal polymerizes. The commercially available product is an aqueous solution containing from 22–26% of glyoxal and from 3–4% of formaldehyde. The product is evidently prepared by the catalytic air oxidation of acetylene, ethylene glycol, or acetaldehyde and contains formaldehyde as a by-product and impurity. The latter is presumed to be formed by the splitting of some of the glyoxal molecules during the synthesis. For this reason, commercially available solutions if employed for hardening gelatin and gelatino silver-halide emulsions give rise to difficulties because of the presence of formaldehyde therein.

Efforts have been made to separate the formaldehyde from the formaldehyde-glyoxal mixture to obtain a relatively pure glyoxal solution. Distillation which appeared to be a feasible approach was tried. This method gives only partial separation for it was found that a glyoxal-formaldehyde mixture acts similarly to a formaldehyde-water mixture in that it forms constant boiling mixtures, and attempts to alter this condition by pressure, vacuum, and steam distillation have not been successful.

It was felt that since methone (5,5-dimethyldihydroresorcinol) selectively reacted with formaldehyde, there must be differences in other aldehyde reactions which would make possible the elimination of the formaldehyde from the mixture. A systematic survey was made of the effect of various compounds on formaldehyde-glyoxal mixtures of different concentrations including the use of various hydrazines, hydrogen sulfide, sulfur dioxide, metals and metal oxides, phenol type compounds and the Cannizzaro reaction (involving the reduction of one molecule of formaldehyde by the oxidation of another molecule thereof). Both acid and alkaline conditions were studied. An analysis of the reaction products produced in these tests indicated that the percentages of both formaldehyde and glyoxal decreased proportionately. While some of these reactions did show a selective reaction rate for formaldehyde in the mixture, none of these was satisfactory because the formaldehyde was not completely removed. In most cases substantial amounts of glyoxal were removed with the formaldehyde.

An inspection of the formulae of formaldehyde ($CH_2O$) and glyoxal $(CHO)_2$ reveals a structural similarity. Both compounds polymerize and are completely hydrated in aqueous solutions. In view of this similarity most of the reactions of formaldehyde can be carried out with glyoxal.

A further survey of the literature, on the reactions of aldehydes and dialdehydes, reveals the following: When formaldehyde is treated with a small amount of mineral acid, it is almost completely polymerized to paraformaldehyde. Aqueous solutions of glyoxal when heated on a water bath produce polyglyoxal, which is a water-containing amorphous yellow product (Beil., vol. 1, 4th edition, page 760).

Formaldehyde and a phenol readily condense in the presence of a mineral acid or an alkali. Condensation of phenols with formaldehyde also takes place in the presence of an amine, such as an alkyl or aryl amine, as a catalyst. Glyoxal-sodium bisulfite addition product $$(CHO)_2 \cdot (NaHSO_3)_2$$

and β-naphthol condense in a mixture of acetic and concentrated hydrochloric acids to yield 62% of the inner acetal of bis(2-hydroxy-1-naphthol) acetaldehyde melting at 235° C. If 5% excess of glyoxal is used, the yield is 72% (Monatsh. 73, pages 45–56, 1940; cf. Chem. Abs. 34, 5435). The literature, accordingly, establishes a marked analogy between the reactivity of formaldehyde on the one hand and glyoxal on the other.

It is an object of the present invention to provide a simple and economical method for the complete removal of formaldehyde from formaldehyde-glyoxal mixtures by selective reaction of the formaldehyde into a solid product and the removal thereof from the mixture leaving substantially pure glyoxal.

Other objects and advantages will appear hereinafter.

The procedure which I employ to selectively remove formaldehyde from glyoxal solutions containing it, involves treating such solution, having a pH between 0.75 to 1.5 with β-naphthol and heating the mixture for from one to several hours. During this period of heating the formaldehyde reacts preferably with the β-naphthol and is completely found as a solid reaction product removable by filtration. Very surprisingly, the glyoxal is not polymerized nor does it react to any substantial extent with the β-naphthol. Thus, the resultant filtered solution has a clear yellow straw color and ranges in yield from 85–95% of the total glyoxal in the original formaldehyde-glyoxal mixture and is free of formaldehyde.

In practicing the present invention, the total formaldehyde content in the formaldehyde-glyoxal mixture is determined by any one of the known methods and a calculation made on the basis of the formaldehyde present to determine the quantity of β-naphthol necessary to completely remove the formaldehyde. The calculated amount of the β-naphthol should be utilized in about a 10% excess. To the glyoxal-formaldehyde solution is added a sufficient quantity of either a water-soluble alkali or acid, as occasion demands to bring the pH of the solution between 0.75 and 1.5. This is a critical range and its observance may explain why the glyoxal remains substantially inert during the reaction.

The solution is then heated to a temperature of 95–100° C. and the solid β-naphthol added as rapidly as the agitator will disperse the dry powder into the solution. An alcohol solution of β-naphthol may be employed instead. The temperature is maintained at 95–100° C. for a period of from one to several hours. The reaction can be followed by removing samples from time to time and testing the filtered and decolorized solution with either methone or a modified Schiff reagent. The color of the insoluble reaction product also gives a good indication of the reaction rate.

When the sample gives a negative test for formaldehyde, the reaction is considered complete. Since the only detrimental effect of longer reaction time is a slight darkening of the solution, the heating may be continued for an additional two hours to make completely certain that the reaction is complete. The mixture is then cooled to room temperature. The insoluble formaldehyde-β-naphthol condensation product, methylene bis-(β-naphthol), floats in the concentrated glyoxal solution. The solution is drawn off, and the condensation product then washed with distilled water to remove all of the glyoxal. The combined water solutions are then treated with approximately 1% of their weight of washed nuchar, a decolorizing activated carbon, which removes the last traces of the formaldehyde-naphthol reaction product and gives a clear light amber solution.

Before utilizing the aqueous glyoxal solution for hardening gelatin and gelatino silver-halide emulsions, it is necessary to neutralize any acid present. This can be accomplished by simply adding the calculated quantity of water-soluble alkali. Some darkening of the solution, probably due to high molecular condensation products, accompanies the neutralization. If the neutralization be carried out with sodium carbonate, the darkening is less and the final product is a light straw-colored solution.

In order that those skilled in the art may better understand how the present invention may be carried into effect, the following specific example is given by way of illustration and is not to be regarded as restrictive thereto.

*Example*

30 liters of a commercially available aqueous acid solution containg 24% of glyoxal and 4% of formaldehyde are placed in a 100 liter glass-lined, steam-jacketed kettle equipped with a propeller-type wooden agitator. The solution is adjusted to a pH between .75 and 1.5, preferably not exceeding a pH of 1.3, with either a water-soluble alkali or acid, for example, hydrochloric acid. The solution is then heated to a temperature of 95–100° C. by means of steam and hot water circulating through the jacket, and 7500 grams of β-naphthol are added as rapidly as the agitator will disperse the dry powder into the mixture. The quantity of β-naphthol to be added is in 10% excess of the calculated amount necessary for the removal of the formaldehyde from the solution. The temperature of the reaction mixture is maintained at 95–100° C. for a period of 1–10 hours, and water added from time to time to replace the volume lost by evaporation. Test samples are withdrawn from the reaction mixture each hour and checked for the presence of formaldehyde in the following manner:

A 50 cc. sample is withdrawn and filtered hot to remove the β-naphthol and methylene bis-(β-naphthol). The filtrate is then treated with 5 grams of washed nuchar for 10 minutes and again filtered. To 20 cc. of the clear straw-colored sample 2 cc. of a 1% methanol solution of 5,5-dimethyldihydroresorcinol are added. The solution is allowed to stand in a covered flask for a period of 12 to 14 hours. If formaldehyde is present, the methylene bis-methone will manifest itself as a white haze, colorless needlelike crystals, or white snowflake aggregates in the solution. It has been found advisable to use a known positive and a known negative formaldehyde solution, preferably in glyoxal, as controls.

A much faster but less reliable test for formaldehyde which I have found quite satisfactory for checking is the biochemical test used for the identification of formaldehyde in milk. Whole milk is diluted with an equal volume of water. To 10 cc. of the milk-water solution are added 5 cc. of the glyoxal-formaldehyde solution along with 5 drops of a 10% ferric chloride solution. The mixture is placed in a large test tube and 10 cc. of concentrated sulfuric acid are poured down the side of the tube so that 2 layers are formed. A violet ring forms at the junction of the two liquids after about 10 minutes in the water bath at 68–80° C. if formaldehyde is present. The same controls are used with this reaction as with the methone test.

When the test sample gives a negative reaction for formaldehyde, the reaction is brought to an end by running cold water through the water jacket.

It is to be noted that unnecessary heating as well as variation from the optimum pH of 1.3, tends to both darken the product and lower the final yield. For these reasons, the reaction should be ended as soon as the formaldehyde has been removed. The time required to completely remove the formaldehyde may vary depending upon the concentration of the formaldehyde in the glyoxal solution, the rate of agitation, and size of β-naphthol particles added to the reaction mixture. When the glyoxal solution contains a small amount of formaldehyde and the particle size of the β-naphthol is small, the reaction usually may be completed from 1 to 3 hours. With a higher concentration of formaldehyde in the glyoxal solution, the reaction time may be a little longer and may vary from 2–10 hours. The shorter reaction time results in a lighter product.

Filtration of the reaction mixture is accomplished by vacuum using a large Buchner funnel to remove the methylene bis-(β-naphthol). This solid material is then washed three times with 10–20 liters of distilled water for each wash. Analysis of the washed solutions are checked to determine the number of washings needed. The last wash usually will show .5% glyoxal. The reaction product which has been washed free of glyoxal is then discarded.

In order to determine the actual glyoxal content in the resultant glyoxal solution, the following analytical method may be used:

10 cc. of the glyoxal solution is transferred to a 100 cc. volumetric flask and the sample diluted to volume with distilled water. After mixing, a 20 cc. aliquot portion is transferred to a 250 ml. Erlenmeyer flask. 75 cc. of distilled water and 4 drops of bromphenol blue indicator are added so as to neutralize the sample to a blue-green end-point. To this are added 15 cc. of 15% hydroxylamine hydrochloride reagent which has previously been neutralized with bromphenol blue. The sample is heated to reflux, cooled, and titrated with 0.5 normal sodium hydroxide to a light blue-green end-point. The percent of glyoxal is then computed by the following formula:

$$\frac{(\text{ml. 0.5 N NaOH}) (0.5) (0.29)}{(20/100)(1.035)} = \% \text{ glyoxal}$$

The factor 1.035 in this formula is the specific gravity of the 5% glyoxal solution and when a more accurate analysis is desired, the original sample of 10 cc. is weighed and appropriate substitutions made in the formula.

It might be mentioned that α-naphthol may be employed in lieu of the β-naphthol. The latter, however, is preferred in view of its faster reaction rate with the formaldehyde.

It is evident that my procedure provides a simple and economical method for removing formaldehyde from a formaldehyde-glyoxal mixture. Since it is obvious that many changes and modifications of the invention can be made within the nature and spirit thereof, it is to be understood that the invention is not to be limited to the present disclosure except as set forth in the following claims.

I claim:

1. A process of selectively removing formaldehyde from a formaldehyde-glyoxal mixture which comprises adjusting the pH of said mixture between 0.75 and 1.5, adding β-naphthol thereto, heating the mixture until the formaldehyde reacts with the β-naphthol and separating the β-naphthol-formaldehyde reaction product from the solution.

2. The process according to claim 1 wherein the mixture is heated at a temperature of from 95° to 100° C.

3. The process according to claim 1, wherein the pH of the formaldehyde-glyoxal mixture is adjusted to a pH of 1.3.

HAROLD E. SCHOFIELD.

No references cited.